UNITED STATES PATENT OFFICE.

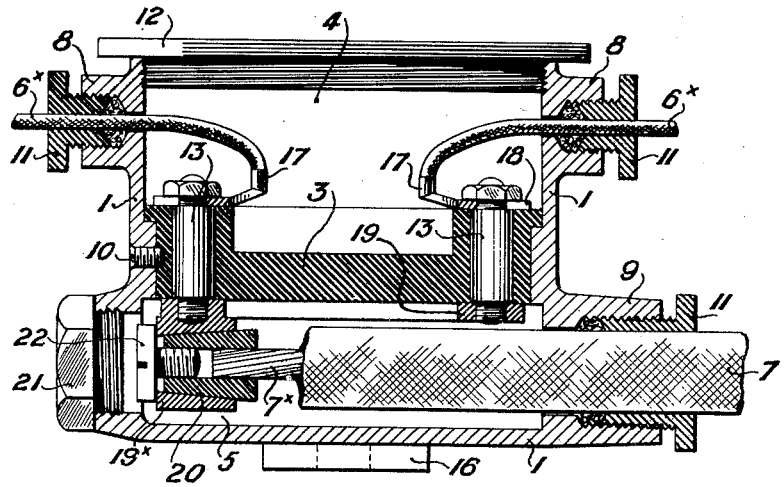
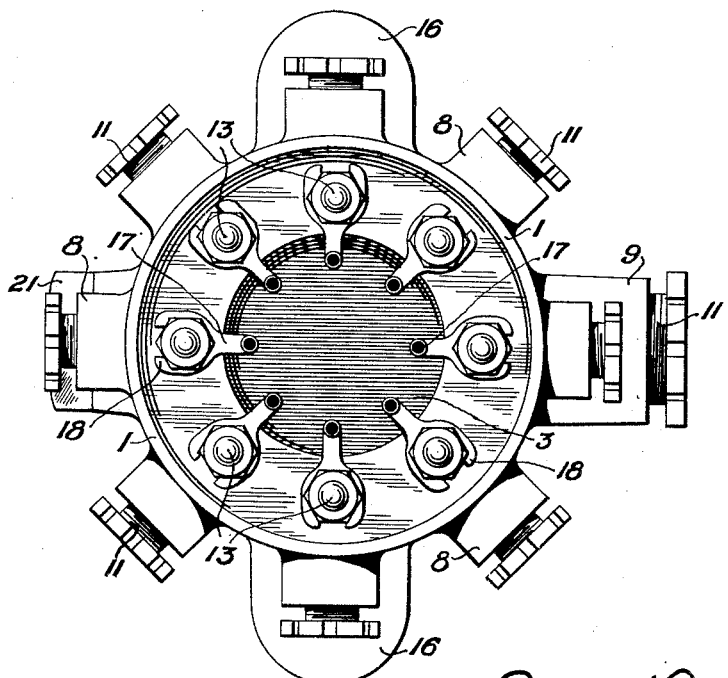

RODOLPH STUART O'NEIL, OF LONDON, ENGLAND, ASSIGNOR TO O'NEIL'S RECORDER SYNDICATE LIMITED, OF LONDON, ENGLAND.

JUNCTION BOX FOR ELECTRIC CONDUCTORS.

1,426,210. Specification of Letters Patent. Patented Aug. 15, 1922.

Application filed September 23, 1920. Serial No. 412,254.

*To all whom it may concern:*

Be it known that I, RODOLPH STUART O'NEIL, a subject of the King of Great Britain, residing at 57 Gracechurch Street, London, England, have invented certain new and useful Improvements in Junction Boxes for Electric Conductors, of which the following is a specification.

This invention relates to junction boxes for connecting the ends of a plurality of electrical conductors to a main cable carrying a single conductor. The object of the present invention is to construct a junction box in which the connecting devices are so arranged that the dimensions of the box for a given number of connections may be as small as possible and consist of few parts all of which can be manufactured with ease and rapidity and can be readily assembled without requiring great skill, while the connections can be made in any desired order with considerable ease of manipulation. Moreover a further object of the invention is to provide a junction box having the above mentioned characteristics which can be closed air and watertight with ease and certainty.

Further objects and advantages of the present invention will be apparent from the following description when read in conjunction with the accompanying drawings, in which drawings—

Fig. 1 is a vertical section of a junction box embodying my improvements.

Fig. 2 is a plan of the box shown in Fig. 1.

A metal casing 1 is fitted interiorly with a disc 3 of insulating material which divides the casing into two chambers, 4 and 5. One of such chambers 4 is capable of being closed in an air and watertight manner by means of a screw-threaded closure cap 12, and in view of the fact that a plurality of electrical conductors are to enter such chamber, a plurality of tubular extensions 8 are formed in the wall of the casing, corresponding with the number of the electrical conductors $6^x$. Each tubular extension 8 is fitted with a stuffing box and gland 11, and one electrical conductor passes through each tubular extension 8 from the exterior to the interior, where the end of each conductor is connected to one end of its particular terminal pin 13. Any suitable packing is then inserted in the stuffing boxes of the tubular extensions 8, and the glands 11 are screwed into place, so that the junction box is rendered air and watertight.

It is frequently convenient to fit the end of each conductor $6^x$ within the chamber 4 with a metal connection piece 17 formed with a fork 18 as shown at Fig. 2, so that the fork can be easily passed beneath the nut of the terminal pin 13.

The chamber 5 upon the opposite side of the disc 3 is formed with a closed base, and the terminal pins 13, where they enter the chamber 5, are screwed into a ring 19 of conducting material, which ring is formed with a boss $19^x$ having a conical hole adapted to receive a conical nipple 20. A tubular extension 9 is formed on the casing, communicating with the chamber 5, and is formed with a stuffing box and provided with a gland 11.

The main cable 7, prior to insertion into the junction box, has its conductor $7^x$ fixed into the nipple 20, and the gland 11 is threaded over the said cable. The cable is then inserted through the extension 9 so that the nipple 20 enters the hole in the boss $19^x$.

A closure cap 21 normally closing the opening in the casing 1 opposite the boss $19^x$ having been removed, a screw 22 can be inserted to engage the screw-threaded bore of the nipple 20 and the head of the screw 22 acting against the boss $19^x$ when rotated draws and holds the conical nipple 20 firmly into the hole in the boss $19^x$, after which the closure cap 21 can be screwed into position.

The junction box described can be fixed in any desired position by means of the lugs 16 formed upon the casing 1.

Having thus fully described my invention, I claim:—

In a junction box for connecting the ends of a plurality of electrical conductors to a main cable carrying a single conductor, the combination with a casing, a disc of insulating material dividing said casing into two chambers and a plurality of terminal pins of conducting material passing through said disc and spaced apart therein, said plurality of conductors being respectively connected to said terminal pins in one chamber, of a ring of conducting material located in the other of said chambers and electrically connected with all of said terminal pins, a boss formed on said ring, and means for connecting said single conductor with said boss.

In witness whereof I have hereunto set my hand in the presence of two witnesses.

RODOLPH STUART O'NEIL.

Witnesses:
 THOMAS WILLIAM ROGERS,
 LESHER S. ROGERS.